United States Patent
Cost

(10) Patent No.: US 10,604,366 B2
(45) Date of Patent: Mar. 31, 2020

(54) ANTI-SKEW STRAIGHTENING MECHANISM

(71) Applicant: Crane Payment Innovations, Inc., Malvern, PA (US)

(72) Inventor: Evan J. Cost, Audubon, PA (US)

(73) Assignee: Crane Payment Innovations, Inc., Malvern, PA (US)

(*) Notice: Subject to any disclaimer, the term of this patent is extended or adjusted under 35 U.S.C. 154(b) by 0 days.

(21) Appl. No.: 15/775,790

(22) PCT Filed: Nov. 11, 2016

(86) PCT No.: PCT/US2016/061716
§ 371 (c)(1),
(2) Date: May 11, 2018

(87) PCT Pub. No.: WO2017/083787
PCT Pub. Date: May 18, 2017

(65) Prior Publication Data
US 2018/0327206 A1 Nov. 15, 2018

Related U.S. Application Data

(60) Provisional application No. 62/254,050, filed on Nov. 11, 2015.

(51) Int. Cl.
*B65H 9/00* (2006.01)
*B65H 5/06* (2006.01)
*H04N 1/00* (2006.01)

(52) U.S. Cl.
CPC .............. *B65H 9/006* (2013.01); *B65H 5/06* (2013.01); *H04N 1/00681* (2013.01);
(Continued)

(58) Field of Classification Search
CPC ........ B65H 9/004; B65H 9/006; B65H 9/008; B65H 2701/1912; B65H 9/20; B65H 9/14; H04N 1/00718; H04N 1/00721
See application file for complete search history.

(56) References Cited

U.S. PATENT DOCUMENTS

| 4,708,456 A | 11/1987 | Shibata et al. |
| 5,219,159 A | 6/1993 | Malachowski et al. |

(Continued)

FOREIGN PATENT DOCUMENTS

| CN | 1260276 A | 7/2000 |
| CN | 1468419 A | 1/2004 |

(Continued)

OTHER PUBLICATIONS

China National Intellectual Property Administration, Office Action and Search Report in connection with Application No. CN201680065713.3, dated Jul. 3, 2019, 9 pages.

(Continued)

*Primary Examiner* — Patrick Cicchino

(57) ABSTRACT

One example embodiment in this disclosure provides an apparatus comprising an opening configured to receive a banknote into a banknote path. The apparatus also includes a plurality of inboard transport wheels positioned in the banknote path and configured to transport the banknote in a direction longitudinal to the banknote path. The apparatus also includes at least one initial transport wheel positioned in the banknote path and nearer to the opening than the plurality of inboard transport wheels, the at least one initial transport wheel configured to transport the banknote from the opening to a first of the plurality of inboard transport wheels. The at least one initial transport wheel causes the banknote to pivot around the first inboard transport wheel when a leading edge of the banknote contacts the first (Continued)

inboard transport wheel. Pivoting causes banknote to contact a second of the plurality of inboard transport wheels.

14 Claims, 9 Drawing Sheets

(52) U.S. Cl.
CPC ..... *H04N 1/00718* (2013.01); *H04N 1/00721* (2013.01); *H04N 1/00734* (2013.01); *B65H 2404/12* (2013.01); *B65H 2404/13* (2013.01); *B65H 2701/1912* (2013.01)

(56) References Cited

U.S. PATENT DOCUMENTS

| | | | |
|---|---|---|---|
| 5,632,478 A | 5/1997 | Quesnel et al. | |
| 5,649,276 A | 7/1997 | Quesnel et al. | |
| 5,775,690 A | 7/1998 | Quesnel et al. | |
| 6,650,865 B2 | 11/2003 | Quesnel | |
| 6,712,356 B2 | 3/2004 | Daout et al. | |
| 8,424,872 B2 | 4/2013 | Iwakawa | |
| 2004/0012142 A1* | 1/2004 | Saltsov | G07D 11/17 271/264 |
| 2007/0296141 A1 | 12/2007 | Inoue | |
| 2013/0256985 A1* | 10/2013 | Samoto | B65H 5/062 271/225 |
| 2014/0027976 A1 | 1/2014 | Zubarevich et al. | |
| 2016/0023858 A1* | 1/2016 | Mizuno | B65H 9/002 271/228 |

FOREIGN PATENT DOCUMENTS

| | | |
|---|---|---|
| CN | 1915678 A | 2/2007 |
| EP | 0300095 A1 | 1/1989 |

OTHER PUBLICATIONS

European Patent Office, "Supplementary European Search Report," Application No. EP16865175, dated Jul. 16, 2019, 70 pages.
European Patent Office, "Communication pursuant to Article 94(3) EPC," Application No. EP16865175.0, dated Jul. 31, 2019, 8 pages.

* cited by examiner

ANTI-SKEW STRAIGHTENING MECHANISM

CROSS-REFERENCE TO RELATED APPLICATION(S)

The present application claims priority under 35 U.S.C. § 365 to International Patent Application No. PCT/US2016/061716 filed Nov. 11, 2016, entitled "ANTI-SKEW STRAIGHTENING MECHANISM", and through International Patent Application No. PCT/US2016/061716, to U.S. Provisional Patent Application No. 62/254,050, filed Nov. 11, 2015, each of which are incorporated herein by reference into the present disclosure as if fully set forth herein.

TECHNICAL FIELD

This disclosure is generally directed to automated payment systems. More specifically, this disclosure is directed to an anti-skew straightening mechanism.

BACKGROUND

When accepting and validating banknotes from a user it is optimal to present the banknotes as straight as possible. This greatly reduces jamming issues seen within banknote handling equipment that has the capability of recycling the banknotes back to the user. One solution to overcome jamming issues is to only accept banknotes of fixed width by restricting the dimensions of the opening into which the banknotes are presented. When accepting banknotes of multiple widths into an opening however, the banknotes can now be presented or fed in at a skewed or angled orientation. That is, the opening is restricted to a width that accommodates the widest banknote, and this width causes the smaller width banknotes to be prone to skew relative to the banknote path within the equipment. This skewed or angled orientation can result in the corners of the banknote sliding along the edge of the banknote path, which is a condition that results in jams as the banknote passes through transition areas in the banknote handling equipment.

SUMMARY

This disclosure provides an anti-skew straightening mechanism.

One example embodiment in this disclosure provides an apparatus comprising an opening configured to receive a banknote into a banknote path. The apparatus also includes a plurality of inboard transport wheels positioned in the banknote path and configured to transport the banknote in a direction longitudinal to the banknote path. The apparatus also includes at least one initial transport wheel positioned in the banknote path and nearer to the opening than the plurality of inboard transport wheels, the at least one initial transport wheel configured to transport the banknote from the opening to a first of the plurality of inboard transport wheels. The at least one initial transport wheel causes the banknote to pivot around the first inboard transport wheel when a leading edge of the banknote contacts the first inboard transport wheel. Pivoting causes banknote to contact a second of the plurality of inboard transport wheels.

Another example embodiment in this disclosure provides a system comprising a banknote validator configured to determine a validity of a banknote. The system also includes a banknote recycler coupled to the banknote validator and configured to temporarily store the banknote. The system also includes a banknote acceptor configured to receive the banknote and transport the banknote to the banknote validator. The banknote acceptor includes an opening configured to receive the banknote into a banknote path. The banknote acceptor also includes a plurality of inboard transport wheels positioned in the banknote path and configured to transport the banknote in a direction longitudinal to the banknote path. The banknote acceptor includes at least one initial transport wheel positioned in the banknote path and nearer to the opening than the plurality of inboard transport wheels. The at least one initial transport wheel is configured to transport the banknote from the opening to a first of the plurality of inboard transport wheels. The at least one initial transport wheel causes the banknote to pivot around the first inboard transport wheel when a leading edge of the banknote contacts the first inboard transport wheel. Pivoting causes banknote to contact a second of the plurality of inboard transport wheels.

Yet another example embodiment in this disclosure provides a method to straighten a banknote including receiving, through an opening, the banknote into a banknote path. The method also includes transporting, by at least one initial transport wheel, the banknote from the opening to a first of a plurality of inboard transport wheels. The at least one initial transport wheel is positioned in the banknote path and nearer to the opening than the plurality of inboard transport wheels. The one initial transport wheel causes the banknote to pivot around the first inboard transport wheel when a leading edge of the banknote contacts the first inboard transport wheel. Pivoting causes banknote to contact a second of the plurality of inboard transport wheels.

Other technical features may be readily apparent to one skilled in the art from the following figures, descriptions, and claims.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

This disclosure provides an anti-skew straightening mechanism that can be used to straighten a skewed (or angled) banknote into alignment with a document path within banknote handling equipment. The anti-skew straightening mechanism helps to reduce or eliminate the risk of jamming a banknote within a banknote handling equipment that has the capability of recycling the banknotes back to the user. For example, banknote handling equipment may include a banknote validator, banknote acceptor, or a banknote recycler, wherein the validator accepts global banknotes of different widths presented at a range of angular orientations, but the acceptor or recycler performance is increased with banknotes having a straight orientation (i.e., substantially parallel to the banknote path). Note that the term "banknote" can be an item of value, such as a bill, document, security paper, valuable sheet, coupon, currency, or other similar item.

FIGS. 1-3 and 5-6 illustrate an example anti-skew straightening mechanism 100 according to embodiments of the present disclosure. The anti-skew straightening mechanism 100 can be one example of a transport mechanism.

Figure 1:
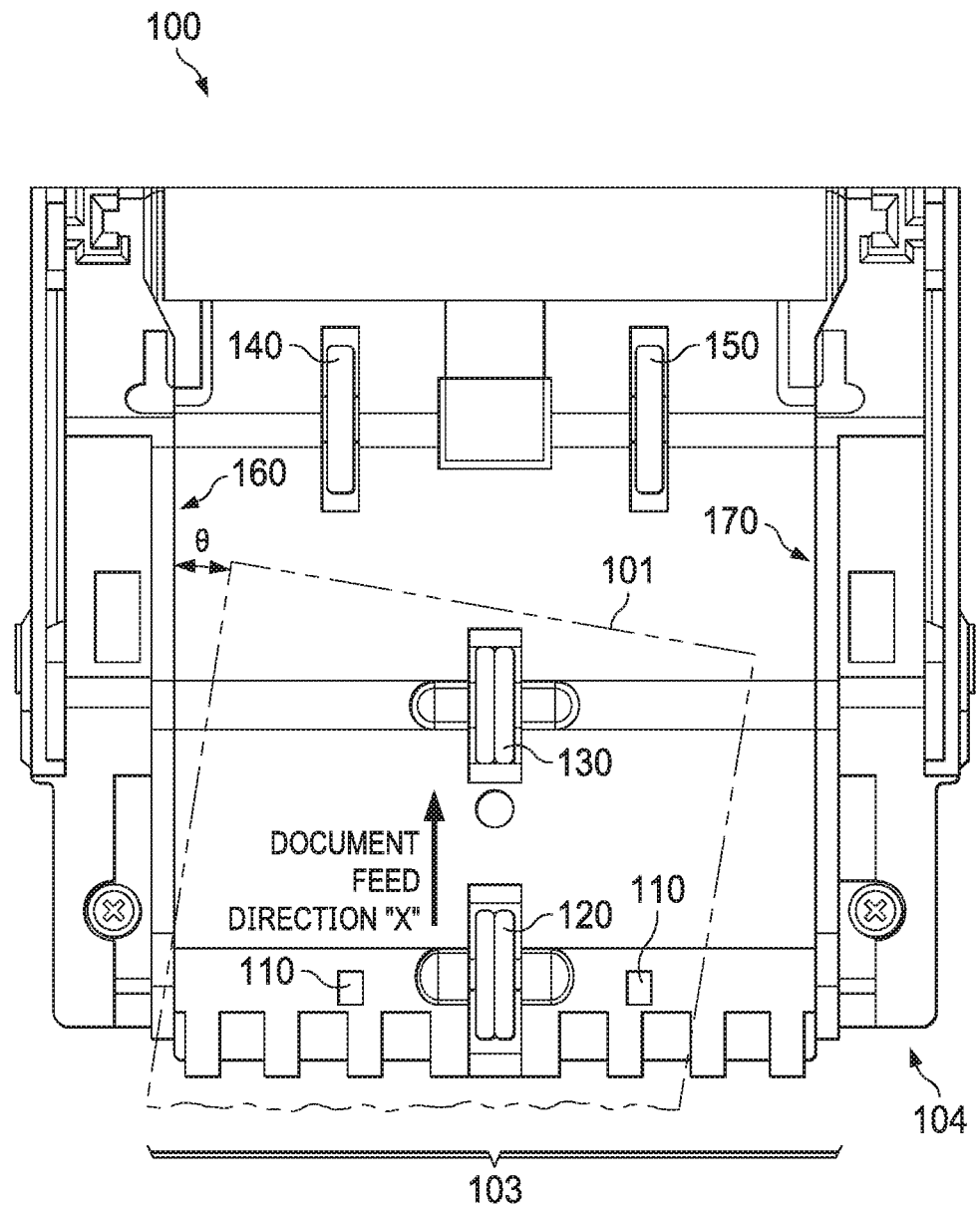
FIGS. 1-3 illustrate an example anti-skew straightening mechanism according to embodiments of the present disclosure.

FIG. 1 illustrates a top surface of a lower portion the anti-skew straightening mechanism 100 receiving a banknote 101 in a skewed orientation.

In FIG. 1, the mechanism 100 includes chassis 104, sensors 110, initial transport wheel 120 and 130, inboard transport wheels 140 and 150, and side surfaces 160 and 170. The wheels 120-150 can be driven by drive mechanisms and the wheel 120-150 can be formed in circular, oval, or oblong surfaces. In one embodiment, the wheels 120 and 130 are configured to rotate at such a speed that the outer surface velocity is approximately the same. Wheels 120 and 130 rotate in such a way that the phase angle between the surfaces of the wheels 120 and 130 is fixed at approximately 180 degrees. In other embodiments, different phase angles may be used, such as 90 degrees and the like. The wheels 120 and 130 also permit some freedom for the banknote 101 to slide laterally while being driven in the longitudinal direction "X" along the banknote path. In contrast, the wheels 140 and 150 provide a relatively firm clamping action to the banknote when not being driven by a drive mechanism.

The anti-skew straightening mechanism 100 also includes an opening 103 for receiving a banknote into banknote handling equipment, start sensors 110 for detecting an insertion of the banknote 101 and initiating transport of the banknote through the entrance of the opening and along a banknote path, a set of initial transport wheels 120 and 130 for feeding the banknote 101 in a document feed direction "X" that is longitudinal to the banknote path, a set of inboard transport wheels 140 and 150 for feeding the banknote 101 in the document feed direction; and side surfaces 160 and 170 for restricting a width of the opening 103 and forming a banknote path. The anti-skew straightening mechanism 100 further includes a processing device, a memory coupled to the processing device, and a drive mechanism for driving the set of initial transport wheels 120 and 130 and independently driving the set of inboard transport wheels 140 and 150 under control by the processing device.

The opening 103 is formed between a lower portion of a banknote validator and an upper portion of the banknote validator that is aligned vertically above the lower portion. A user may insert a banknote 101 into the opening 103, such as by inserting a leading edge of the banknote through the opening 103. The width of the opening 103 is the distance between the side surfaces 160, 170 of the banknote 101, which can correspond to the width of the widest banknote accepted by the banknote validator plus a clearance distance. When the user inserts a banknote that is narrower than the widest acceptable banknote, the banknote may be skewed left, thereby forming an angle $\theta$ between the left edge of the banknote 101 and the left side surface 160. Similarly, if the user inserts the banknote with a right skewed orientation, a similar angle may form on between the right edge of the banknote 101 and the right side surface 170.

The start sensors 110 are configured to detect when a leading edge of a banknote 101 is inserted into the opening 103, to generate a start sensor signal in response to detecting the leading edge, and to send the start sensor signal to the processing device. Each start sensor 110 includes a light emitting source, such as a light emitting diode (LED). In certain embodiments, each start sensor 110 further includes a light detector, such as a phototransistor. In certain embodiments, the light sources and light detectors are on opposite sides of the banknote 101, thus forming a cross channel start sensor. In another embodiment, light sources and light detectors are on the same side of the banknote 101, such that either both are disposed on the lower portion or the upper portion of the banknote validator. The start sensors 110 are disposed just within the entrance of the opening 103 and prior to the set of initial transport wheels 120 and 130.

Each initial transport wheel 120 and 130 includes a soft drive point, such as a pinch point at the top center of the transport wheel where friction and pressure are applied between the banknote and the transport wheel. The soft drive point of the front initial transport wheel 120 is disposed just inward from the start sensors 110, which enables the anti-skew straightening mechanism 100 to transport the banknote 101 into the document feed direction as soon as a user inserts a leading edge of the banknote 101 into the opening 103. The front initial transport wheel 120 is disposed closer to the opening 103 than the back initial transport wheel 130. The front initial transport wheel 120 and back initial transport wheel 130 can be identical to each other. The soft drive point of the back initial transport wheel 130 is disposed at a midpoint between the opening 103 and the set of inboard transport wheels 140 and 150, which enables the anti-skew straightening mechanism 100 to transport the banknote 101 into the document feed direction "X" from a location specified by a vertex of the compact triangular arrangement (discussed more particularly below with reference to FIG. 3). The set of initial transport wheels 120 and 130 are disposed on the lower portion of the bank validator and are centered about the width of the opening 103.

Each inboard transport wheel 140 and 150 includes a soft drive point, such as a pinch point at the top center of the transport wheel where friction and pressure are applied between the banknote and the transport wheel. The left inboard transport wheel 140 and the right inboard transport wheel 150 can be identical to each other and can rotate about the same axis. In certain embodiments, the inboard transport wheels 140 and 150 are located equidistant from the opening 103 or equidistant from the back initial transport wheel 130. The set of inboard transport wheels 140 and 150 can be positioned on the lower portion of the bank validator. The distance between the left side surface 160 and the left inboard transport wheel 140 can be the same distance between the right side surface 170 and the right inboard transport wheel 150. The distance between the inboard transport wheels 140 and 150 is at least the width of the narrowest banknote accepted by the banknote validator, which enables the anti-skew straightening mechanism 100 to transport any acceptable banknote using contact of both wheels within the set of inboard transport wheels 140 and 150. Having two points of contact provides a more firm grip on the banknote 101.

The drive mechanism includes a gear that is coupled (e.g., connected) to the set of initial transport wheels 120 and 130 for driving a rotational motion. The drive mechanism includes another gear that is coupled to the set of inboard transport wheels 140 and 150 for driving a rotational motion. The drive mechanism receives control signals from the processing device and performs specified driving functions in response. Specifically, the drive mechanism can drive one gear to rotate the set of initial transport wheels 120 and 130 while not rotating the other gear to maintain the set of inboard transport wheels 140 and 150 in a stopped state. The drive mechanism can drive one gear to rotate the set of initial transport wheels 120 and 130 at a specified speed while driving the other gear to rotate the set of inboard transport wheels 140 and 150 at a different speed than the specified speed.

The memory may include any non-transitory computer-readable medium including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes.

The processing device can be a single processor or a number of processors, all of which could also include multiple computing units. The processing device may be implemented as one or more microprocessors, microcomputers, microcontrollers, digital signal processors, central processing units, state machines, logic circuitries, or any devices that manipulate signals based on operational instructions. Among other capabilities, the processing device is configured to fetch and execute computer-readable instructions and data stored in the memory. The processing device is configured to control other components of the anti-skew straightening mechanism 100 to perform a method of centering and pivoting the banknote from a skewed orientation to a straight orientation, as described more particularly below.

Figure 2:
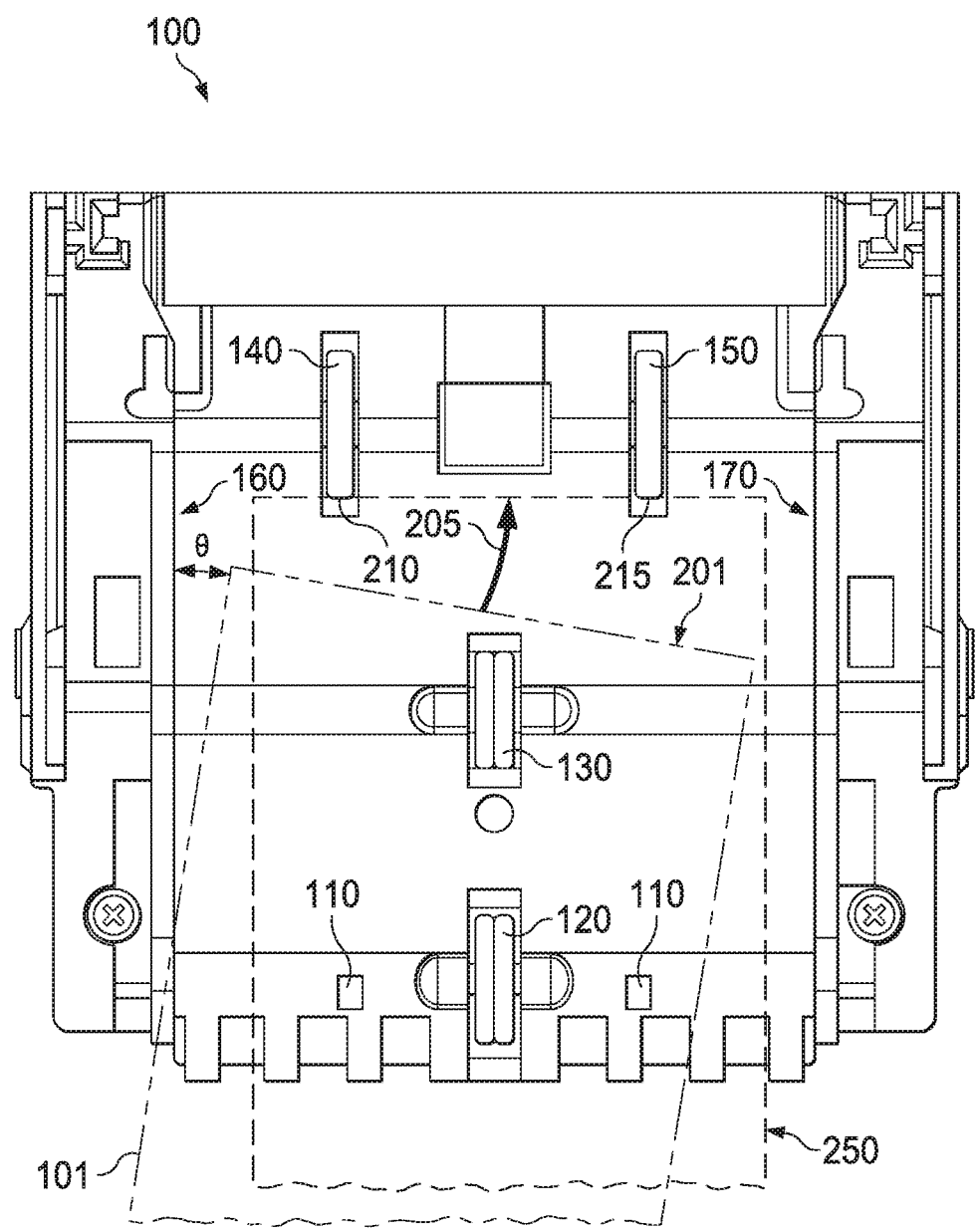

FIG. 2 illustrates the anti-skew straightening mechanism 100 performing a method of centering and pivoting the banknote from a skewed orientation to a straight orientation.

The method begins when a banknote 101, such as a left skewed banknote, enters into the anti-skew straightening mechanism 100 through the opening 103. The start sensors 110 detect the entrance of the banknote 101 through the opening 103, and send a start sensor signal to the processing device. In response to receiving the start sensor signal, the processing device sends a control signal to the drive mechanism, which is configured to cause the drive mechanism to drive the set of initial transport wheels 120 and 130. That is, the set of initial transport wheels 120 and 130 transport the skewed banknote in the document feed direction X.

Until the forward motion of the leading edge 201 of the skewed banknote 101 is impeded at point 210 on the set of inboard transport wheels 140 and 150, the drive mechanism continues to drive the set of initial transport wheels 120 and 130. Accordingly, while driven, the set of initial transport wheels 120 and 130 repeatedly and alternately (i.e., one initial transport wheel at a time) transport the skewed banknote 101 forward in the document feed direction X. In another example embodiment, the transport wheels 120 and 130 operate continuously and at the same time. The set of inboard transport wheels 140 and 150 are not in motion while the set of initial transport wheels are in motion, and are not in motion when the leading edge 201 of the skewed banknote 101 collides with the high friction surface of the left inboard transport wheel 140 at point 210.

Once the forward motion of the leading edge 201 of the skewed banknote 101 is impeded at point 210, the anti-skew straightening mechanism 100 pivots the skewed banknote about point 210 until the leading edge 201 of the banknote hits point 215 of the inboard transport wheels. The arrow 205 represents the pivoting action. That is, the set of initial transport wheels 120 and 130 continue to push the mid-portions of the banknote 101 forward while at point 210 until the leading edge 201 of the banknote pivots and contacts point 215. The processing device is configured to continue driving the set of initial transport wheels 120 and 130 and inboard transport wheels 140 and 150 to transport the banknote 101 when the leading edge 201 of the skewed banknote 101 reaches point 215, which is when the banknote is aligned straight.

There are various ways to indicate to the processing device that the banknote 101 is straight such that the side edges of the banknote 101 are parallel to the side surfaces 160, 170 of the anti-skew straightening mechanism 100. In a fixed delay embodiment, a fixed delay (e.g., about 200 milliseconds) lapses to indicate to the processing device that the banknote 101 is straight. In a variable delay embodiment, alignment sensors detect the orientation of the banknote and send an alignment signals that the processing device uses to determine when the banknote is straight. In the fixed and variable delay embodiments, the processing device controls the drive mechanism to drive the set of initial transport wheels 120 and 130 at the start and then the set of inboard transport wheels 140 and 150 after the fixed or variable delay. In one embodiment, both sets are not driven at the same time. In other embodiments, both sets may be driven at the same time after the inboard transport wheels are started. In a no-delay embodiment, alignment sensors detect whether the banknote 101 is inserted in a straight orientation already, as opposed to being inserted in a skewed orientation, and sends an indicator of straightness to the processing device indicating that the banknote is straight.

The document is now straight, at position 250, and both the initial transport wheels 120 and 130 and the inboard transport wheels 140 and 150 can now be set in motion thereby moving the document fully into the system in a straight condition. The processing device is configured to determine when banknote is aligned straight by using the fixed delay, the alignment signals, or the indicator of straightness. In response to determining that the banknote is aligned straight, the processing device sends a control signal to the drive mechanism, which is configured to cause the drive mechanism to drive the set of inboard transport wheels 140 and 150.

Although the anti-skew straightening mechanism 100 has been described in terms of straightening a left skewed banknote, the anti-skew straightening mechanism 100 can straighten a right skewed banknote using a similar process.

Figure 3:
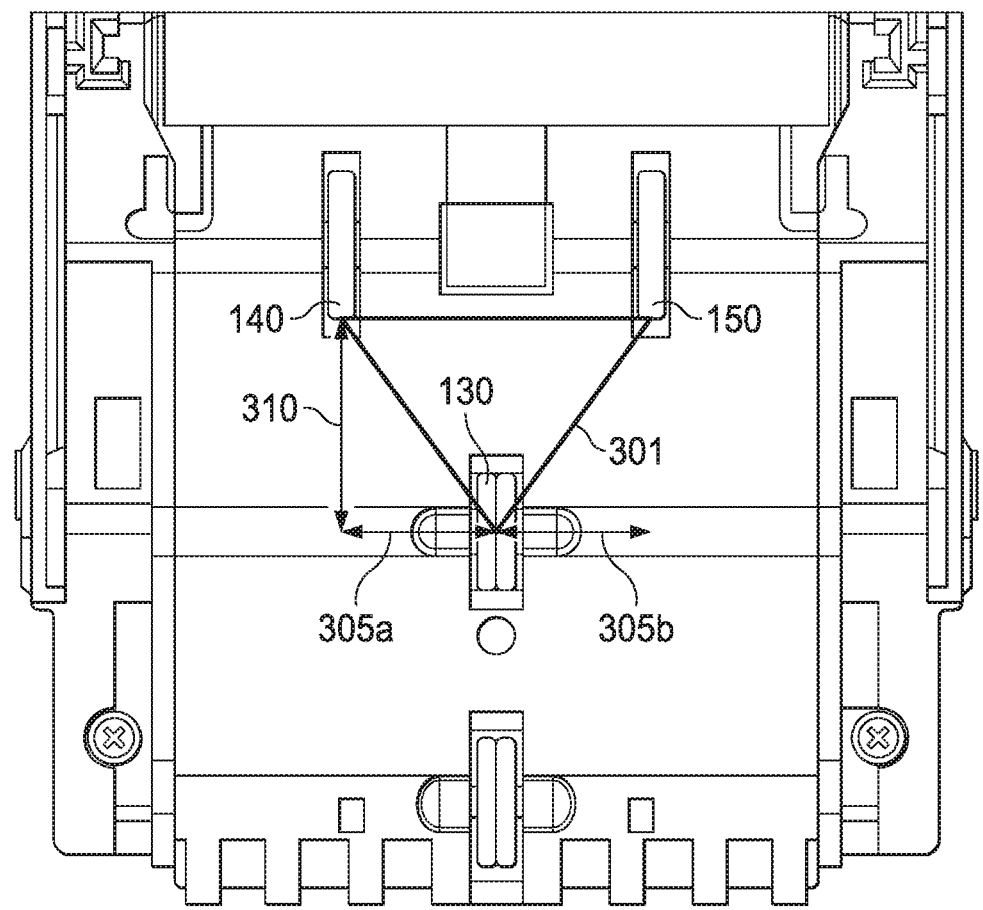

FIG. 3 illustrates a compact triangular arrangement 301 of independently driven wheels within the anti-skew straightening mechanism. The anti-skew straightening mechanism 100 can impart controlled motion to the banknote in order to remove skew and straighten the banknote by setting up the transport wheels 120 and 130, and 140 and 150 in two independently controlled drive systems in a short triangular arrangement with alternating initial drive wheels 120 and 130. In certain embodiments, the length of the banknote path is a relatively short distance, such as about 62 millimeters.

In the compact triangular arrangement 301, the back initial transport wheel 130 is disposed horizontally between the two inboard transport wheels 140 and 150 (shown by a horizontal distance 305a between the back initial transport wheel 130 and the left inboard transport wheel 140), and the two inboard transport wheels 140 and 150 are positioned a lateral distance 310 away from the back initial transport wheel 130 in the forward document feed direction "X". The horizontal distance 305a can be the same as the horizontal distance 305b between the back initial transport wheel 130 and the right inboard transport wheel 150. The compact triangular arrangement establishes a relationship between the horizontal distances 305a-305b and the lateral distance 310 and restricts distances. That is, the lateral distance 310 should not exceed a lateral maximum to prevent rippling or puckering the banknote, the horizontal distances 305a-305b should not exceed a horizontal maximum prevent rippling the banknote, and the horizontal distances 305a-305b and lateral distance 310 should not be less than a respective minimums to ensure that the pivoting action of the banknote can occur.

Although FIGS. 1-3 illustrate one example of anti-skew straightening mechanism 100, various changes may be made to FIGS. 1-3 illustrate. For example, the anti-skew straightening mechanism 100 could be used in automatic ticket seller machines, automatic teller machines, vending machines and other kiosks. Also, there could be different arrangements of wheels 120-140 to accomplish a similar result, such as by having additional rows of initial transports wheels.

Figure 4:
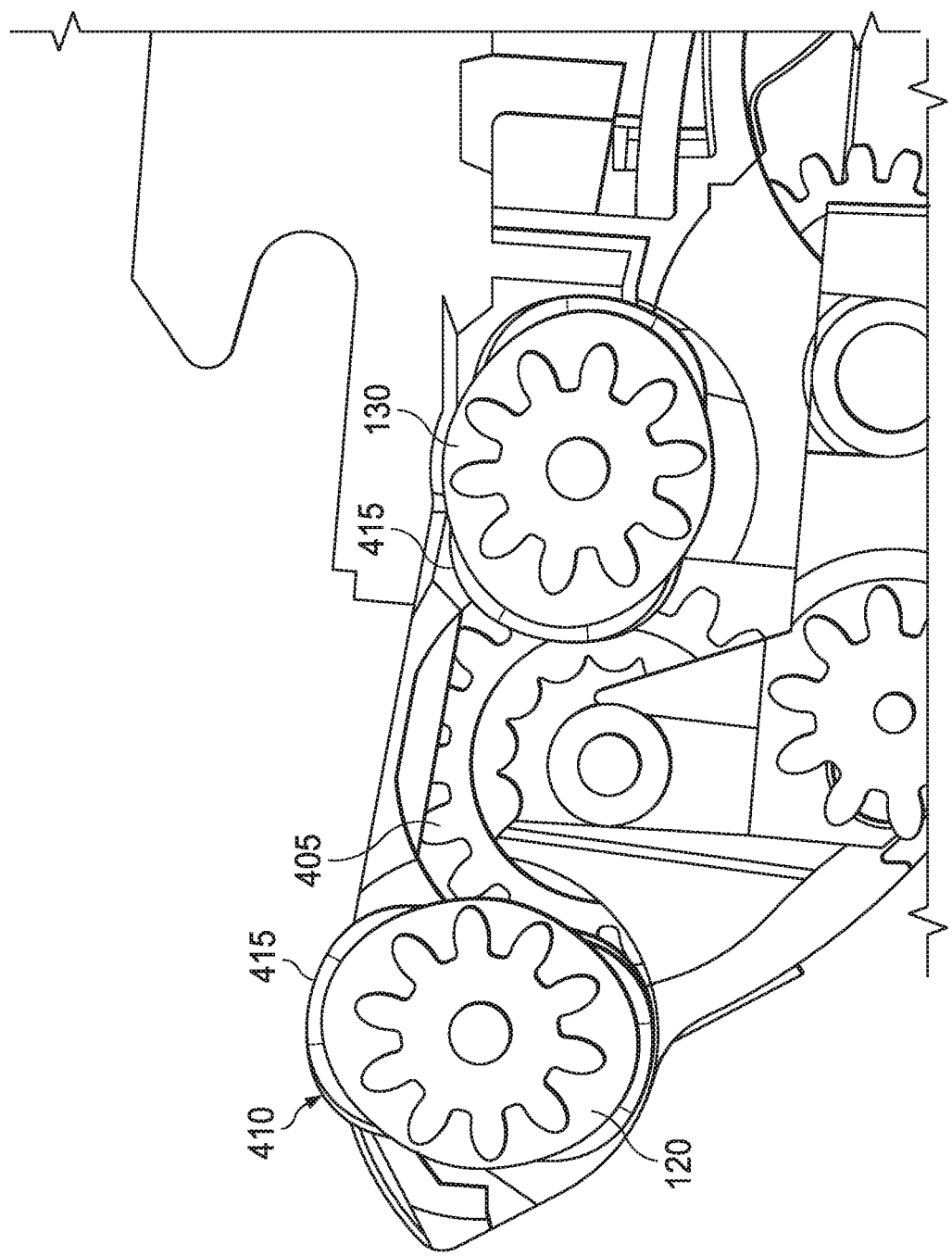
FIG. 4 illustrates the set of initial transport wheels driven by a gear of the drive mechanism according to embodiments of the present disclosure.

FIG. 4 illustrates the set of initial transport wheels 120 and 130 driven by a gear 405 of the drive mechanism according to embodiments of the present disclosure. Wheels 120-130 and gear 405 can be used in the anti-skew straightening mechanism 100 of FIGS. 1-3. The front initial transport wheel 120 out of phase from the back initial transport wheel 130 by the partial revolution of 180° 415. Each initial transport wheel has an oblong shape with a central drive member. The central drive member can be a gear on pulley. The elongated ends can be covered by a high friction material 410 according to the soft drive points. The set of initial transport wheels 120 and 130 provide only one point of contact with the banknote when driving the banknote forward into the banknote handling equipment by alternating initial transport wheels 120 and 130. That is, the banknote is cyclically driven by a first elongated end of the front initial transport wheel 120, then by a first elongated end of the back initial transport wheel 130, next by the second elongated end of the front initial transport wheel 120, and finally by the second elongated end of the back initial transport wheel 130. This allows the banknote to be driven forward by a single point and to pivot about a single point. Although having two points of contact with the banknote would provide a more firm grip on the banknote and may more rapidly drive the banknote into the banknote handling equipment, the multiple drive points negatively impacts the ability to create the pivoting action. Examples of alternating transport wheels are disclosed in U.S. Pat. No. 6,712,356 (which is hereby incorporated by reference). However, the anti-skew straightening mechanism disclosed here could be used by any other suitable mechanism providing a single drive point at a time.

Friction and pressure between the initial transport wheels and the banknote are important to creating the pivoting action. By greatly reducing or eliminating any pinch forces vertically above the initial transport wheels, the anti-skew straightening mechanism 100 provides a "soft drive" system that does not damage the banknote as it meets the non-moving inboard transport wheels 140 and 150 at point 210 and point 215. If too much positive drive (e.g., two driving points of contact) is imparted to the banknote, the excess positive drive force will start to damage the banknote during the delayed start of the inboard transport wheels. This "soft drive" system including the alternating transport wheels provides technical advantages to this anti-skew straightening mechanism.

Additional details regarding one example implementation of the anti-skew straightening mechanism are provided in the Drawings. The anti-skew straightening mechanism 100 could find use in a wide variety of applications, including vending machines or other banknote handling equipment.

This anti-skew straightening mechanism provides other technical advantages. For example, the anti-skew straightening mechanism performs straightening in a small space envelope with few moving parts, and does not need the entire length of the banknote to perform straightening. This is in contrast to a banknote centering device that typically straightens and centers the banknotes from the side by using a drive arrangement to accelerate two opposed side plates for the inertia of the side plates to cause the banknote to be straight and centered, which requires the entire length of the banknote to perform straightening and centering.

Figure 5:
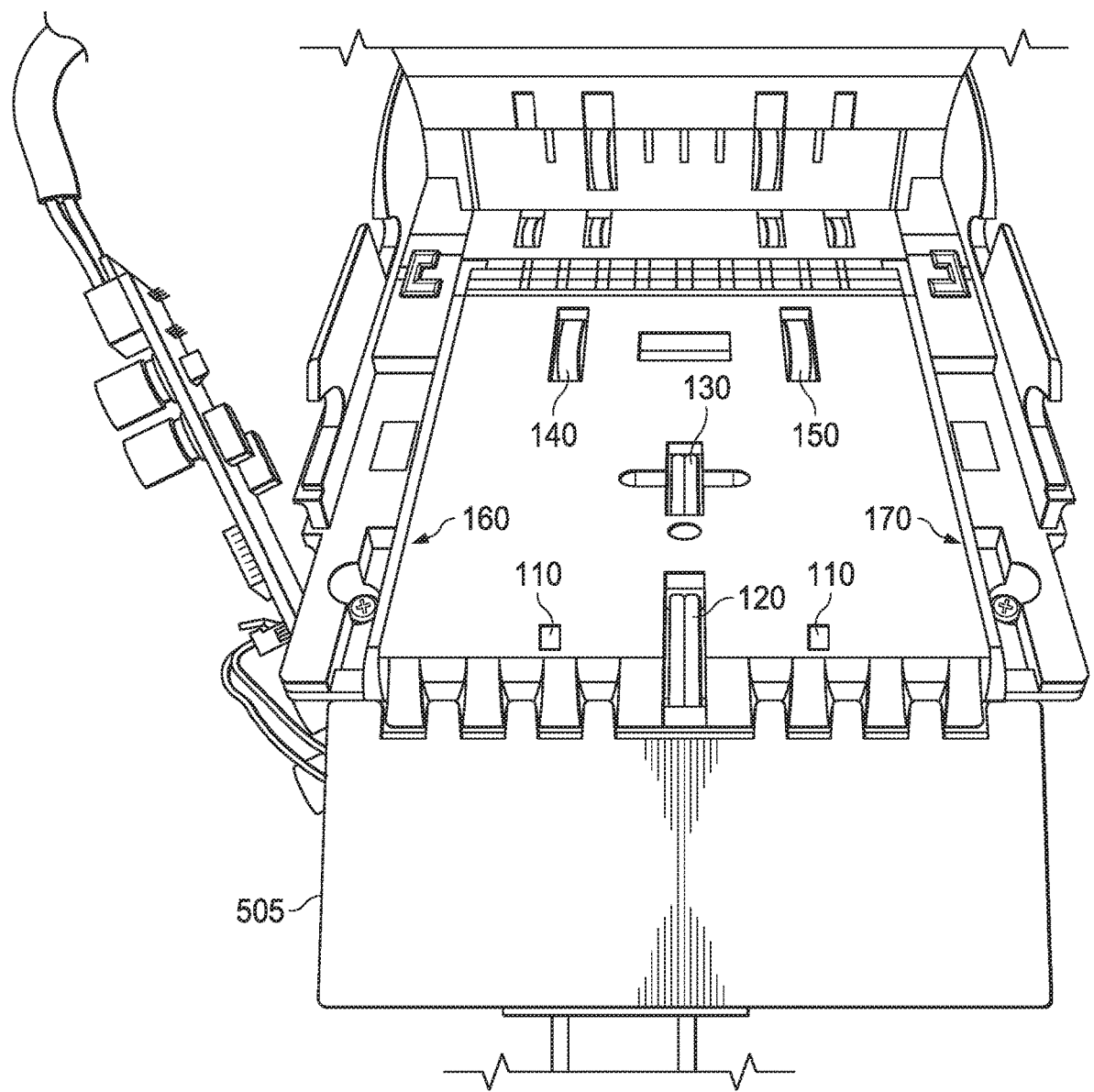
FIGS. 5-6 illustrate an example anti-skew straightening mechanism according to embodiments of the present disclosure.
Figure 6:
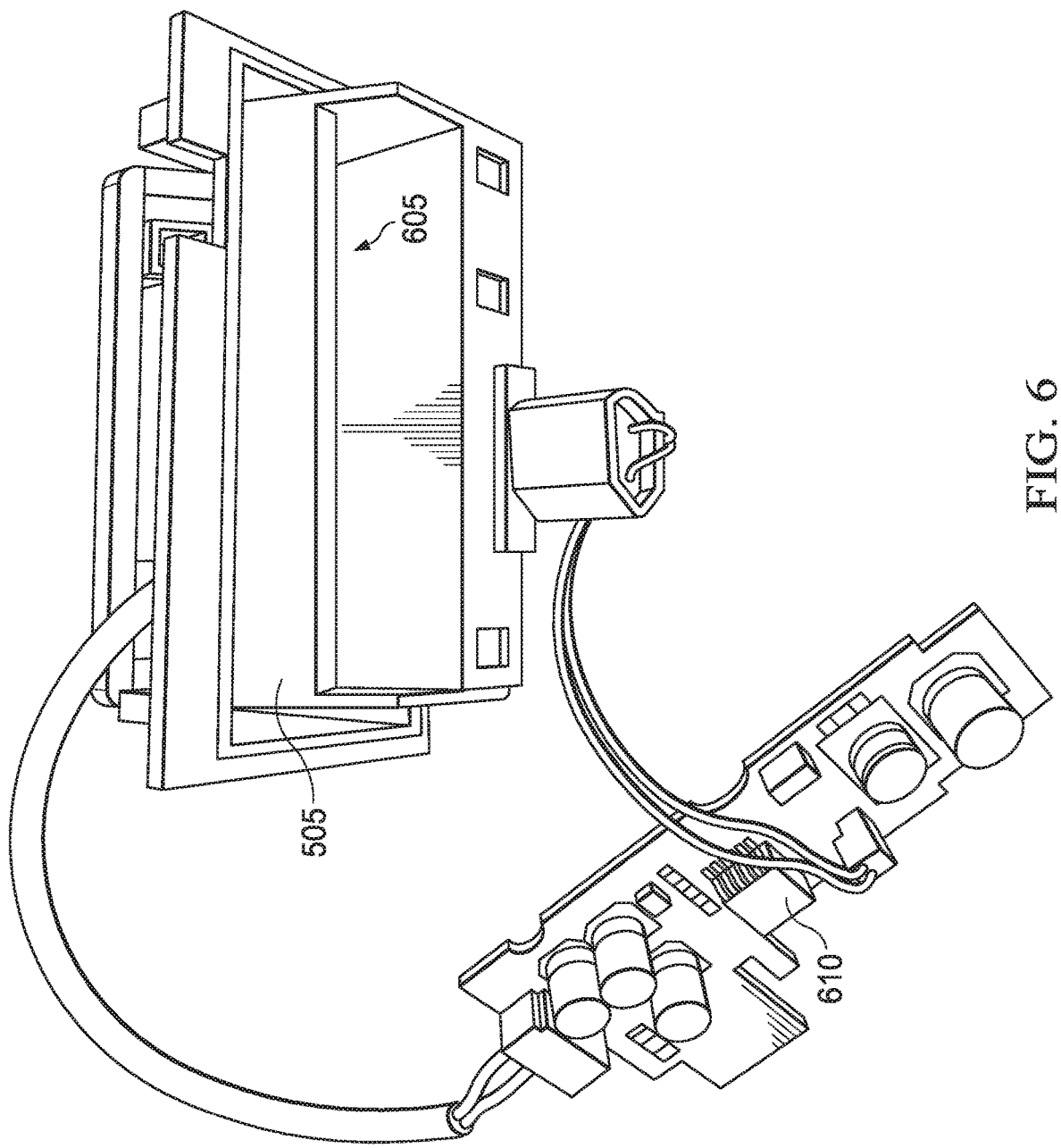

FIG. 5 illustrates the anti-skew straightening mechanism 100 in an open condition, in which the front component 505 comprising the opening hinged down such that the other components 110-170 are visible. FIG. 6 illustrates the anti-skew straightening mechanism 100 in a closed condition, in which the front component 505 comprising the opening 605 hinged up such that the other components 110-170 are hidden from view. The processing device 610 is visible in FIG. 6. The anti-skew straightening mechanism 100 of FIGS. 1-6 can be the same straightening mechanism 100 and different components as illustrated in each FIGURE can be used with each other.

In certain embodiments, a system includes an opening configured to receive a randomly-angled banknote in a forward lateral direction. The system further includes at least one initial transport wheel configured to transport a leading edge of the banknote from the opening to a first point on a surface of a set of inboard transport wheels, and pivot the randomly-angled banknote about the first point until the leading edge of the banknote contacts a second point on the surface of the set of inboard transport wheels such that the banknote is aligned straight relative to a transport path. The system further includes a drive mechanism configured to drive the set of initial transport wheels to rotate and to independently drive the set of inboard transport wheels to rotate. The system further includes a processing device configured to: (i) in response to determining that the opening has received at least a portion of the banknote, cause the drive mechanism to rotate the set of initial transport wheels; and (ii) in response to determining that the banknote is aligned straight, cause the drive mechanism to rotate the set of inboard transport wheels.

In certain embodiments, a system includes an opening configured to receive a randomly-angled banknote in a forward lateral direction, the opening formed between an upper portion and a lower portion of banknote handling equipment. The system further includes at least one initial transport wheel defining a set of initial transport wheels. The set of initial transport wheels is configured to transport a leading edge of the banknote from the opening to a first point on a front surface of a set of inboard transport wheels by rotating. The set of initial transport wheels is configured to pivot the randomly-angled banknote about the first point until the leading edge of the banknote contacts both a second point on the front surface of the set of inboard transport wheels and the first point such that the banknote is aligned straight relative to a transport path. The system further includes a drive mechanism configured to drive the set of initial transport wheels to rotate and to independently drive the set of inboard transport wheels to rotate. The system further includes a processing device configured to: in response to determining that the opening has received the leading edge of the banknote, send a control signal to the drive mechanism, causing the drive mechanism to rotate the set of initial transport wheels. The processing device is further configured to: in response to determining that the banknote is aligned straight, send a control signal to the drive mechanism, causing the drive mechanism to rotate the set of inboard transport wheels in order to transport the aligned straight banknote along the transport path in the forward lateral direction.

Figure 7A:
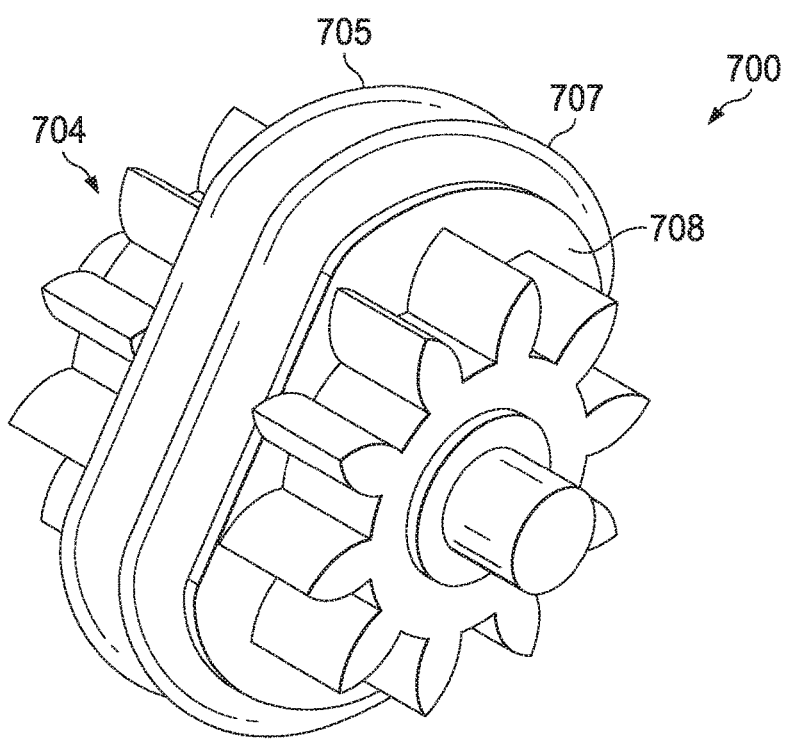
FIGS. 7A and 7B show an implementation of the basic mechanism that is of use if bi-directional transport of the banknote.
Figure 7B:
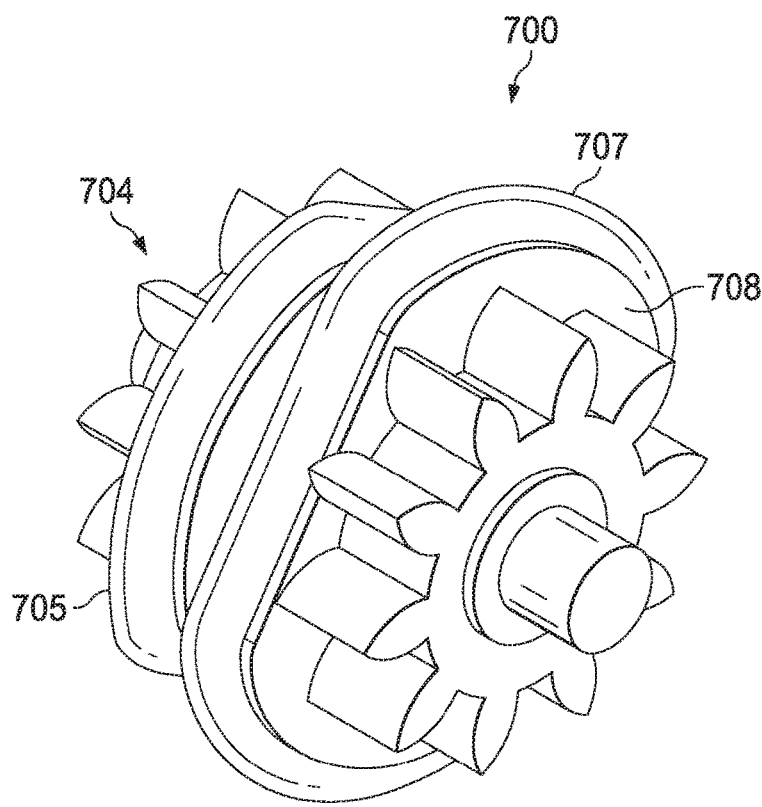

FIGS. 7A and 7B show an implementation 700 of the basic mechanism that is of use if bi-directional transport of the banknote 101. Implementation 700 can be used in the anti-skew straightening mechanism 100 of FIGS. 1-6. Such operation may be used, for example, if it is occasionally necessary to reject a damaged or counterfeit banknote from a banknote acceptor via the same passageway that is used for insertion.

In this example embodiment, the rotors 704 and 708 are split into two parallel rotors of similar profile. A drive arrangement (not shown) causes the two halves of the rotors to be aligned as shown in FIG. 7A during banknote insertion where they effectively act as one part to transport banknote in the direction "X" of FIGS. 1 and 2. Thus, both surfaces 705 and 707 are used to drive the banknote. When reverse rotation is required, however, half of the rotor rotates 90 degrees with respect to its neighbor as shown in FIG. 5B. The effect is to simulate a one-piece circular rotor having a continuous surface formed by the surfaces 705 and 707 for contact with the banknote. Such a rotor in tandem with its peers provides a direct transport along the banknote path in a reverse direction (opposite direction "X" of FIGS. 1 and 2). Many possible variants of rotor geometry (as described above) may be combined with this implementation to achieve the same end effect.

Figure 8:
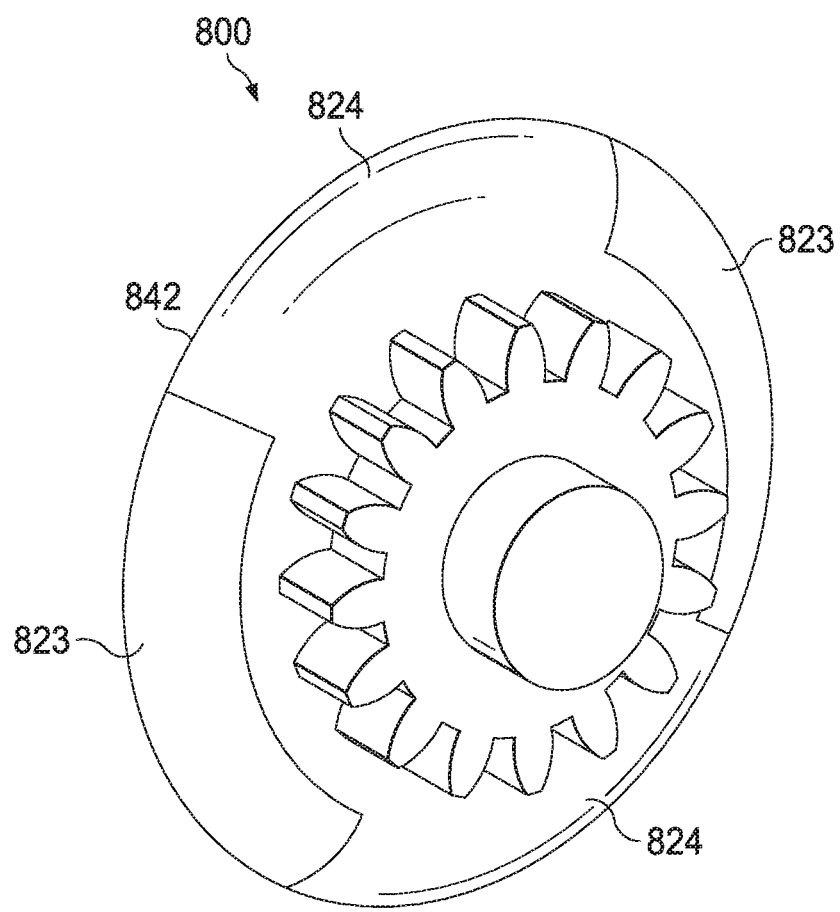
FIG. 8 illustrates another implementation of a rotor that could be used in the system shown in FIG. 1.

FIG. 8 illustrates another implementation of a rotor 800 that could be used in the system shown in FIG. 1. Rotor 800 can be used in the anti-skew straightening mechanism 100 of FIGS. 1-6. The rotor 800 is substantially circular in shape, and has a continuous outer surface 842 that is divided into discrete high friction regions 823 and low friction regions 824. The drive force of the rotor 800 is thereby modulated during use by a change in the frictional properties at the point of engagement of the contact surfaces with the banknote. The arrangement and number of sectors 823 and 824 may be varied to achieve enhanced or reduced intermittent drive effects. For example, a plurality of high friction regions may be arranged in a number of narrow or broad strips about the outer surface 842. Further, the drive force of the rotor 800 may be modulated by a combination of methods described above, such as by varying the contact pressure that the surfaces 823 and 824 place on the banknote in a periodic manner.

Figure 9:
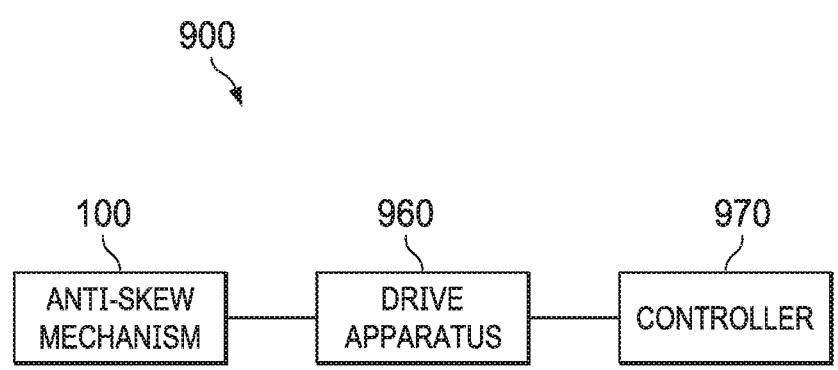
FIG. 9 is a simplified block diagram illustrating an overall anti-skew system.

FIG. 9 is a simplified block diagram illustrating an overall anti-skew system 900. The anti-skew mechanism 100, which can be one example of anti-skew mechanism 100 as shown in FIGS. 1-6, is connected to a drive apparatus 960 which is connected to a controller 970. The drive apparatus may include an electric motor, such as a stepper motor, or other known drive device capable of turning the wheel 120-150 at a uniform speed, or at different speeds, and may further be capable of turning the rotating members such that they are rotating in or out of phase with each other. Wheels 120 and 130 may be driven independently of wheels 140 and 150. The drive apparatus may also be capable of functioning to provide an intermittent drive or continuous drive to turn one or more of the wheels 120-150. The controller 970 may include a microprocessor or other control circuitry for controlling the operation of the drive apparatus and transport mechanism. Various gearing arrangements and/or mechanical connections between the drive apparatus and the transport mechanism may be used to accomplish such operation.

Figure 10:
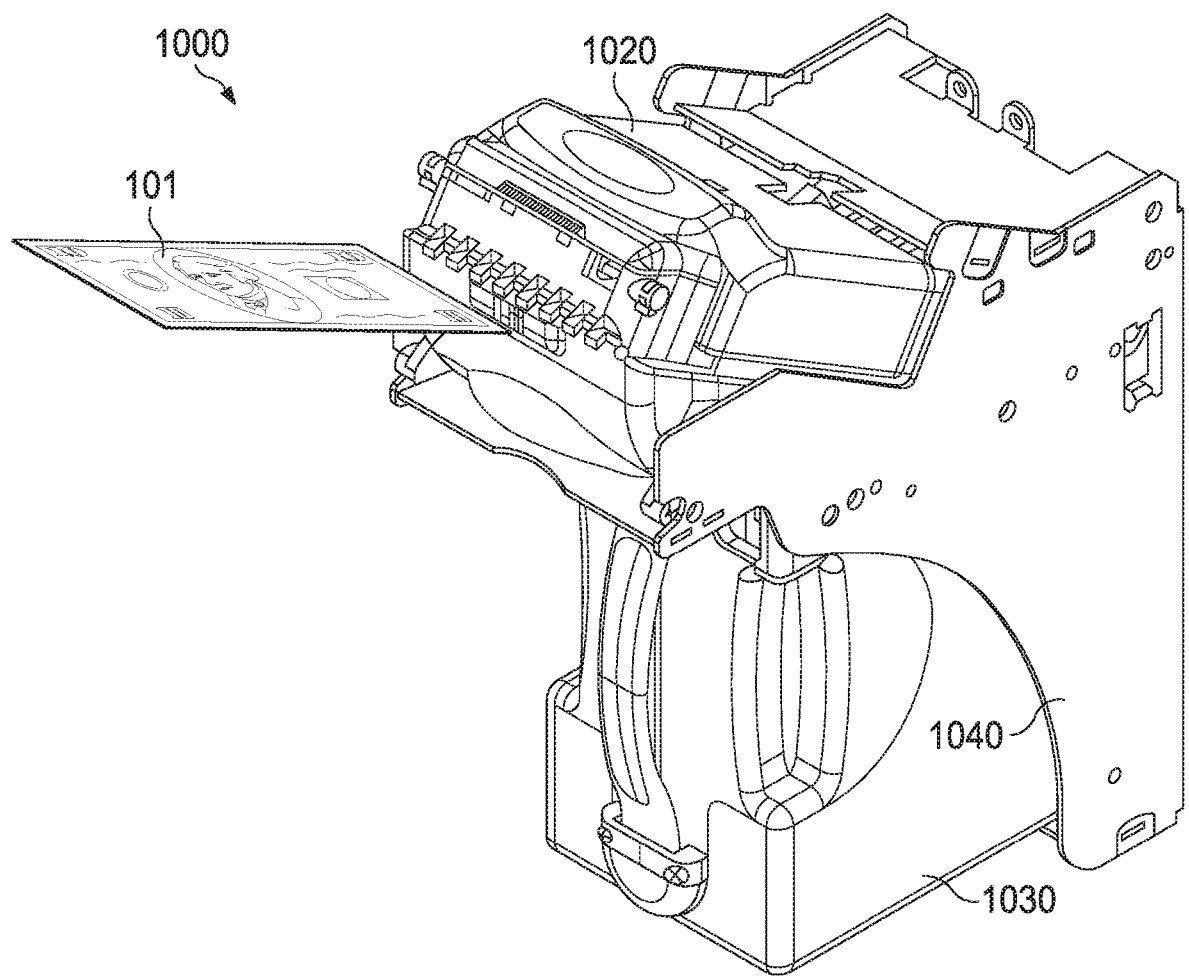
FIG. 10 illustrates an example of a currency handling apparatus according to an embodiment of this disclosure.

FIG. 10 illustrates an example of a currency handling apparatus 1000 according to an embodiment of this disclosure. FIG. 10 illustrates an example currency handling apparatus 1000 according to various embodiments of the present disclosure. Currency handling apparatuses come in a wide variety of configurations, and FIG. 10 does not limit the scope of this disclosure to any particular implementation of a currency handling apparatus. Currency handling apparatus 1000 can include the anti-skew straightening mechanism 100 of FIGS. 1-6.

The currency handling apparatus 1000 includes a banknote validator 1020, a removable storage unit 1030, and a chassis 1040. In some implementations banknote validator 1020 is removably coupled to chassis 1040. Banknote validator 1020 can be configured to receive a banknote 101 and transport currency item 101 past a sensing component to determine the type and validity of banknote 101. In some implementations, banknote validator 1020 further includes a banknote acceptor that includes a transportation mechanism 100 for transporting banknote 101 to and/or through the banknote validator 1020.

Although FIG. 10 illustrates one example of a currency handling apparatus 1000, various changes may be made to FIG. 10. For example, the currency handling apparatus 1000 could be used in automatic ticket seller machines, automatic teller machines, vending machines and other kiosks. Also, there could be more than one removable storage unit 1030 as well as a temporary storage unit, such as a banknote recycler. Further, banknote validator 1020 could accept coins as well as banknotes.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

One example embodiment in this disclosure provides an apparatus comprising an opening configured to receive a banknote into a banknote path. The apparatus also includes a plurality of inboard transport wheels positioned in the banknote path and configured to transport the banknote in a direction longitudinal to the banknote path. The apparatus also includes at least one initial transport wheel positioned in the banknote path and nearer to the opening than the plurality of inboard transport wheels, the at least one initial transport wheel configured to transport the banknote from the opening to a first of the plurality of inboard transport wheels. The at least one initial transport wheel causes the banknote to pivot around the first inboard transport wheel when a leading edge of the banknote contacts the first inboard transport wheel. Pivoting causes banknote to contact a second of the plurality of inboard transport wheels.

In any of the above examples, the apparatus further comprises a drive apparatus configured to drive the plurality of inboard transport wheels and the at least one initial transport wheel. The plurality of inboard transport wheels are driven independently from the at least one initial transport wheel.

In any of the above examples, the banknote is received into the opening in at angle, and wherein the banknote path is wider than the banknote.

In any of the above examples, the apparatus further comprises a plurality of alignment sensors configured to detect an orientation of the banknote; and a controller configured determine when the banknote is straight, and responsive to a determination that the banknote is straight, cause a drive apparatus to drive the plurality of inboard transport wheels to transport the banknote along the banknote path.

In any of the above examples, the apparatus further comprises a controller configured determine when a period of time is elapsed, and responsive to a determination that the period of time is elapsed, cause a drive apparatus to rotate the plurality of inboard transport wheels to transport the banknote along the banknote path.

In any of the above examples, the drive apparatus is further configured to drive the at least one initial transport wheel continuously.

In any of the above examples, one of the at least one initial transport wheels is disposed horizontally between the first and second inboard transport wheels.

Another example embodiment in this disclosure provides a system comprising a banknote validator configured to determine a validity of a banknote. The system also includes a banknote recycler coupled to the banknote validator and configured to temporarily store the banknote. The system also includes a banknote acceptor configured to receive the banknote and transport the banknote to the banknote validator. The banknote acceptor includes an opening configured to receive the banknote into a banknote path. The banknote acceptor also includes a plurality of inboard transport wheels positioned in the banknote path and configured to transport the banknote in a direction longitudinal to the banknote path. The banknote acceptor includes at least one initial transport wheel positioned in the banknote path and nearer to the opening than the plurality of inboard transport wheels. The at least one initial transport wheel is configured to transport the banknote from the opening to a first of the plurality of inboard transport wheels. The at least one initial transport wheel causes the banknote to pivot around the first inboard transport wheel when a leading edge of the banknote contacts the first inboard transport wheel. Pivoting causes banknote to contact a second of the plurality of inboard transport wheels.

In any of the above examples, the banknote acceptor further comprises a drive apparatus configured to drive the plurality of inboard transport wheels and the at least one initial transport wheel, wherein the plurality of inboard transport wheels are driven independently from the at least one initial transport wheel.

In any of the above examples, the banknote is received into the opening in at angle, and wherein the banknote path is wider than the banknote.

In any of the above examples, the banknote acceptor further comprises a plurality of alignment sensors configured to detect an orientation of the banknote; and a controller configured determine when the banknote is straight, and responsive to a determination that the banknote is straight, cause a drive apparatus to drive the plurality of inboard transport wheels to transport the banknote along the banknote path.

In any of the above examples, the banknote acceptor further comprises a controller is configured determine when a period of time is elapsed, and responsive to a determination that the period of time is elapsed, cause a drive apparatus to rotate the plurality of inboard transport wheels to transport the banknote along the banknote path.

In any of the above examples, the drive apparatus is further configured to drive the at least one initial transport wheel continuously.

In any of the above examples, one of the at least one initial transport wheel is disposed horizontally between the first and second inboard transport wheels.

Yet another example embodiment in this disclosure provides a method to straighten a banknote including receiving, through an opening, the banknote into a banknote path. The method also includes transporting, by at least one initial transport wheel, the banknote from the opening to a first of a plurality of inboard transport wheels. The at least one initial transport wheel is positioned in the banknote path and nearer to the opening than the plurality of inboard transport wheels. The one initial transport wheel causes the banknote to pivot around the first inboard transport wheel when a leading edge of the banknote contacts the first inboard transport wheel. Pivoting causes banknote to contact a second of the plurality of inboard transport wheels.

In any of the above examples, the method further includes driving, by a drive apparatus, the plurality of inboard transport wheels and the at least one initial transport wheel, wherein the plurality of inboard transport wheels are driven independently from the at least one initial transport wheel.

In any of the above examples, the banknote is received into the opening at an angle, and wherein the banknote path is wider than the banknote.

In any of the above examples, the method further includes detecting, by a plurality of alignment sensors, an orientation of the banknote; determining, by a controller, when the banknote is straight; and responsive to a determination that the banknote is straight, causing, by a drive apparatus, the plurality of inboard transport wheels to transport the banknote along the banknote path.

In any of the above examples, the method further includes determining, by a controller, when a period of time is elapsed; and responsive to a determination that the period of time has elapsed, causing, by a drive apparatus, the plurality of inboard transport wheels to transport the banknote along the banknote path.

In any of the above examples, the drive apparatus drives the at least one initial transport wheel continuously.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    an opening configured to receive a banknote into a banknote path;
    a plurality of inboard transport wheels positioned in the banknote path and configured to transport the banknote in a direction longitudinal to the banknote path;
    a plurality of initial transport wheels positioned in the banknote path and nearer to the opening than the plurality of inboard transport wheels, the plurality of initial transport wheels configured to transport the banknote from the opening to a first inboard transport wheel of the plurality of inboard transport wheels, wherein one or more of the plurality of initial transport wheels are positioned nearer to the opening than another one of the plurality of initial transport wheels; and
    a controller configured to cause a drive apparatus to drive at least one of the plurality of initial transport wheels alternately with at least another one of the plurality of initial transport wheels in the transport direction
    wherein the plurality of initial transport wheels cause the banknote to pivot around the first inboard transport wheel when a leading edge of the banknote contacts the first inboard transport wheel, and
    wherein pivoting causes the banknote to contact a second inboard transport wheel of the plurality of inboard transport wheels.

2. The apparatus of claim 1, wherein the drive apparatus is configured to drive the plurality of inboard transport wheels, wherein the plurality of inboard transport wheels is driven independently from the plurality of initial transport wheels.

3. The apparatus of claim 1, wherein the banknote is received into the opening at an angle, and wherein the banknote path is wider than the banknote.

4. The apparatus of claim 1,
    wherein the controller is further configured to determine when a period of time is elapsed, and, responsive to a determination that the period of time is elapsed, cause the drive apparatus to rotate the plurality of inboard transport wheels to transport the banknote along the banknote path.

5. The apparatus of claim 1, wherein the plurality of initial transport wheels is disposed along a center line of the banknote path.

6. A system comprising:
    a banknote validator configured to determine a validity of a banknote;
    a banknote recycler coupled to the banknote validator and configured to temporarily store the banknote; and
    a banknote acceptor configured to receive the banknote and transport the banknote to the banknote validator, wherein the banknote acceptor includes:
        an opening configured to receive the banknote into a banknote path;
        a plurality of inboard transport wheels positioned in the banknote path and configured to transport the banknote in a direction longitudinal to the banknote path;
        a plurality of initial transport wheels positioned in the banknote path and nearer to the opening than the plurality of inboard transport wheels, the plurality of initial transport wheels configured to transport the banknote from the opening to a first inboard transport wheel of the plurality of inboard transport wheels, wherein one or more of the plurality of initial transport wheels are positioned nearer to the opening than another one of the plurality of initial transport wheels; and
        a controller configured to cause a drive apparatus to drive at least one of the plurality of initial transport wheels alternately with at least another one of the plurality of initial transport wheels in the transport direction
        wherein the plurality of cause the banknote to pivot around the first inboard transport wheel when a leading edge of the banknote contacts the first inboard transport wheel, and
        wherein pivoting causes the banknote to contact a second inboard transport wheel of the plurality of inboard transport wheels.

7. The system of claim 6, wherein the drive apparatus is configured to drive the plurality of inboard transport wheels, wherein the plurality of inboard transport wheels is driven independently from the plurality of initial transport wheels.

8. The system of claim 6, wherein the banknote is received into the opening at an angle, and wherein the banknote path is wider than the banknote.

9. The system of claim 6, wherein the controller is further configured to determine when a period of time is elapsed, and, responsive to a determination that the period of time is elapsed, cause the drive apparatus to rotate the plurality of inboard transport wheels to transport the banknote along the banknote path.

10. The system of claim 6, wherein the plurality of initial transport wheels is disposed along a center line of the banknote path.

11. A method to straighten a banknote comprising:
    receiving, through an opening, the banknote into a banknote path; and
    transporting, by a plurality of initial transport wheels, the banknote from the opening to a first inboard transport wheel of a plurality of inboard transport wheels,
    wherein the plurality of initial transport wheels is positioned in the banknote path and nearer to the opening than the plurality of inboard transport wheels,
    wherein one or more of the plurality of initial transport wheels are positioned nearer to the opening than another one of the plurality of initial transport wheels,
    wherein the plurality of initial transport wheels cause the banknote to pivot around the first inboard transport wheel when a leading edge of the banknote contacts the first inboard transport wheel,
    wherein, pivoting the banknote includes causing, by a controller, a drive apparatus to drive at least one of the plurality of initial transport wheels alternately with at least another one of the plurality of initial transport wheels in the transport direction, and
    wherein pivoting causes the banknote to contact a second inboard transport wheel of the plurality of inboard transport wheels.

12. The method of claim 11, further comprising:
    driving, by the drive apparatus, the plurality of inboard transport wheels, wherein the plurality of inboard transport wheels is driven independently from the plurality of initial transport wheels.

13. The method of claim 11, wherein the banknote is received into the opening at an angle, and wherein the banknote path is wider than the banknote.

14. The method of claim 11, further comprising:
- determining, by the controller, when a period of time is elapsed; and
- responsive to a determination that the period of time has elapsed, causing, by the drive apparatus, the plurality of inboard transport wheels to transport the banknote along the banknote path.

* * * * *